United States Patent [19]
Fisher

[11] Patent Number: 5,257,803
[45] Date of Patent: Nov. 2, 1993

[54] SUPPORT PLATFORM FOR KICKSTANDS

[76] Inventor: Ronald W. Fisher, 15608 Passaie La., Bowie, Md. 20716

[21] Appl. No.: 834,785

[22] Filed: Feb. 13, 1992

[51] Int. Cl.⁵ .............................................. A47B 91/00
[52] U.S. Cl. .................................. 248/346; 280/293; 280/301
[58] Field of Search ................. 248/346, 346.1, 188.9; 280/301, 293; D12/120

[56] References Cited

U.S. PATENT DOCUMENTS

| | | | |
|---|---|---|---|
| 133,520 | 12/1872 | Coles | 248/346.1 |
| 342,970 | 6/1886 | Ongley | 248/346.1 |
| 1,730,698 | 10/1929 | Wagner | 248/346.1 |
| 3,831,209 | 8/1974 | Clingman | 248/346.1 |
| 3,955,829 | 5/1976 | Bussler | 248/188.9 X |
| 4,474,387 | 10/1984 | Maranell | 248/346 X |
| 4,521,031 | 6/1985 | Huth | 280/293 |
| 4,625,987 | 12/1986 | Marsh | 280/301 X |

*Primary Examiner*—J. Franklin Foss
*Attorney, Agent, or Firm*—David A. Testardi

[57] ABSTRACT

A support platform is adapted to prevent kickstands and other load carrying members from sinking into an underlying surface. The support platform is generally disc shaped and is provided with a channel or cut-out therein which aids in establishing and/or maintaining an alignment between the kickstand and the support platform as the kickstand is being lowered onto the support platform. The support platform is particularly suited for mass production.

14 Claims, 1 Drawing Sheet

SUPPORT PLATFORM FOR KICKSTANDS

BACKGROUND OF THE INVENTION

1. Field of the Invention

This invention pertains to the field of support platforms which are adapted to be positioned beneath kickstands and other load carrying members for the purpose of distributing the loads carried by these members. More particularly, this invention pertains to the field of support platforms which are adapted to be positioned beneath motorcycle kickstands for the purpose of supporting parked motorcycles.

2. Description of the Related Art

When parking a motorcycle, it is customary for a motorcyclist to position an article of manufacture or nature (such as a brick, a rock, or a stick) beneath the kickstand of his motorcycle in order to keep the kickstand from sinking into the underlying road surface or terrain. While at times these articles perform adequately for their intended purpose, it is often the case that these articles are not conveniently available to the motorcyclist and/or not practical for him to use. In such instances, the motorcyclist may return to find his parked motorcycle lying on its side.

In the past, other devices have been proposed which function to prevent a cycle or motorcycle kickstand from sinking into the underlying road surface or terrain. However, while these devices may adequately fulfill their intended functions, it remains desirable to provide a kickstand support platform which is readily adaptable to mass production and which effectively prevents a motorcycle kickstand or like device from sinking into an underlying surface.

SUMMARY OF THE INVENTION

It is an object of the invention to provide a support platform for kickstands and like devices which is readily suited for mass production and which positively prevents the kickstand or like device from sinking into an underlying surface.

It is another object of the invention to provide a support platform having a channel or cut-out formed therein which ensures that the kickstand or like device will not slip off the support platform.

Specifically, the invention comprises a generally disc-shaped support platform provided with a channel therein, the generally disc-shaped platform having a substantially planar horizontal top surface, a substantially planar horizontal bottom surface, and a substantially cylindrical peripheral surface extending in a vertical direction between the top surface and the bottom surface, wherein the channel includes a substantially planar recessed surface delimited by a generally U-shaped sidewall surface, the recessed surface being parallel to and recessed from the top surface and the generally U-shaped sidewall surface extending between the recessed surface and the top surface, and wherein the generally U-shaped sidewall surface includes a pair of generally planar sidewall surface portions which extend chordally inwardly from the substantially cylindrical peripheral surface in parallel directions and which are joined together by a concave, part-frustoconical sidewall surface portion.

In another aspect, the invention comprises a generally disc-shaped support platform provided with a cut-out therein, the generally disc-shaped platform having a substantially planar top surface, a substantially planar bottom surface, and a substantially cylindrical peripheral surface, wherein the substantially cylindrical peripheral surface has the form of a circular cylinder, wherein the circular cylinder defines a central axis, wherein the cut-out defines a substantially planar recessed surface surrounded by a generally U-shaped sidewall surface, the recessed surface being parallel to and recessed from the top surface and the generally U-shaped sidewall surface extending between the recessed surface and the top surface, wherein the generally U-shaped sidewall surface includes a pair of substantially straight sidewall surface portions which extend inwardly from the substantially cylindrical peripheral surface in parallel directions and which are joined together by a concave sidewall surface portion, wherein the concave sidewall surface portion defines part of a geometric shape that is symmetrical about the central axis, and wherein a diameter of the circular cylinder is at least twice as great as a diameter of the concave sidewall surface portion.

The invention will, however, be best understood by a review of the following specification in conjunction with the accompanying drawings, in which:

Detailed Description of the Preferred Embodiments

Figure 1:
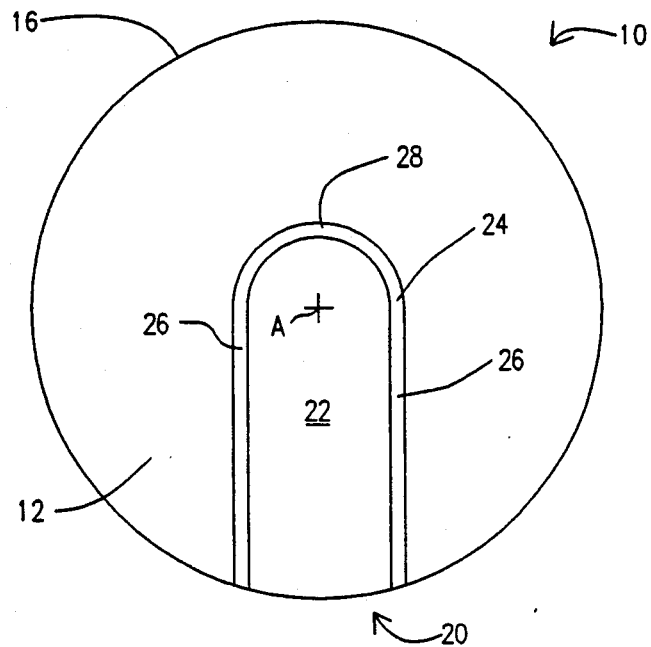
FIG. 1 is a top view of the support platform according to the invention.
Figure 2:
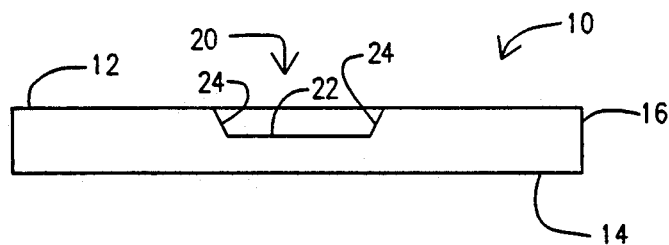
FIG. 2 is a frontal view of the support platform according to the invention.

Referring to FIGS. 1 and 2, there is shown a generally disc-shaped support platform 10 provided with a channel or cut-out 20 therein. The platform 10 has a substantially planar horizontal top surface 12, a substantially planar horizontal bottom surface 14, and a substantially cylindrical peripheral surface 16. The peripheral surface 16 defines a periphery of the generally disc-shaped platform and extends in a vertical direction between (or intermediate) the top surface 12 (or the plane defined thereby) and the bottom surface 14 (or the plane defined thereby). According to the invention, the peripheral surface 16 is in the form of a circular cylinder with a diameter of between 3 and 8 inches (preferably substantially between 4 and 5 inches) and the top surface 12 is spaced from the bottom surface 14 by a distance of between (or substantially between) 0.4 inches and 1.0 inch in the vertical direction.

The channel or cut-out 20 includes a substantially planar recessed surface 22 which is delimited by a generally U-shaped sidewall surface 24. As shown in FIG. 2, the recessed surface 22 is substantially parallel to and recessed from the top surface 12, and the generally U-shaped sidewall surface 24 extends between the recessed surface 22 and the top surface 12. Preferably, a depth of the channel or cut-out is approximately one half the thickness of the support platform 10.

Figure 3:
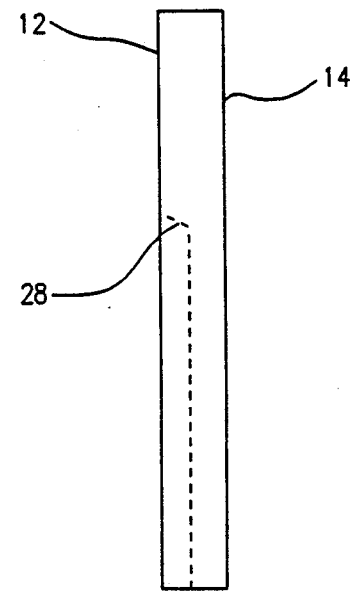
FIG. 3 is a side view of the support platform according to the invention.

As shown in FIGS. 1 and 3, the generally U-shaped sidewall surface 24 includes a pair of planar or generally planar (i.e. substantially straight) sidewall surface portions 26 which extend chordally inwardly in parallel directions from the substantially cylindrical peripheral surface 16 and which are joined together by a concave sidewall surface portion 28. (By "chordally inwardly", it is meant that the generally planar sidewall surface portions 26 each extend in a direction of a chord of the circle or closed curve which the substantially cylindrical peripheral surface 16 defines.) According to the invention, the concave sidewall surface portion 28 is part of an axially symmetrical geometric shape, and preferably the concave sidewall surface portion 28 is part-frustoconical in that it constitutes a 180 degree element of a truncated cone. The pair of generally planar sidewall surface portions 26 taper gradually away from each other as they extend from the recessed surface 22 to the top surface 12 of the support platform. (In the embodiment shown in FIGS. 1 to 3, an angle of between substantially 100 and 135 degrees is formed between each of the generally planar sidewall surface portions 26 and the substantially planar recessed surface 22.) According to the invention, the pair of generally planar sidewall surface portions 26 are spaced apart (e.g. at the recessed surface 22) by approximately 1.5 inches, or by a distance slightly greater than a longitudinal width of a motorcycle kickstand. Moreover, a central axis (denoted in FIG. 1 at A) of the concave, part-frustoconical sidewall surface portion 28 is coextensive with a central axis of the circular cylinder which defines the peripheral surface 16 (e.g. also denoted at A). Therefore, a diameter of the concave, part-frustoconical sidewall surface portion (e.g. defined at the recessed surface 22) will be (according to the invention) equal to the spacing between the generally planar sidewall surface portions 26. (In selecting the spacing of the generally planar sidewall surface portions 26 for non-motorcycle applications, it is advantageous to require that a diameter of the substantially cylindrical peripheral surface be at least twice as large as the diameter of the concave, part-frustoconical sidewall surface portion, as defined above, in order to ensure adequate load distribution.)

In use, the support platform 10 is positioned beneath a motorcycle kickstand (or other load carrying member, not shown) in such a manner that the end of the kickstand will rest on the recessed surface 22 of the channel or cut-out 20. According to the invention, as the kickstand is being lowered onto the recessed surface 22, the generally planar sidewall surface portions 26 will aid in establishing and/or maintaining proper alignment between the kickstand and the support platform, thus assuring that the kickstand will be properly supported by the support platform 10.

The support platform 10 may, according to the invention, be made of any substantially rigid material including aluminum (or an alloy thereof), steel, wood, natural rubber, or plastics or other synthetic materials. It should be borne in mind, however, that the material must have sufficient strength to support a substantial portion of the weight of the motorcycle (or bicycle, small trailer, scaffold, etc.) for which the invention is used. In a modification, the support platform may, according to the invention, be made out of metal (e.g. steel) and thereafter may be chrome plated e.g. for use with show motorcycles.

The support platform 10 readily lends itself to mass production. In a first presently preferred method of manufacturing, the support platform is cast from aluminum directly into the desired shape. A logo, company name or other identifying indicia is advantageously provided on the bottom surface 14 as a part of the casting process. After casting, the surface of the support platform may advantageously be finished or burnished e.g. by using a tumbling barrel to effect ball peening. In a second presently preferred method of manufacturing, aluminum cylindrical stock having a diameter of 4 inches is cut into discs each having a thickness of 0.6 inches. A channel or cut-out is then cut into one face of each disc (according to the above teachings) using an end mill. An appropriate rotating cutter is selected for the mill which has a diameter equal to the desired spacing between the generally planar sidewall surface portions (e.g. 1.5 inches) and a taper equal to the desired taper of the channel or cut-out. The disc is placed in the mill and the rotating cutter is lowered to the appropriate cutting position and then moved radially inwardly across the face of the disc (e.g. several times) until the channel or cut-out is formed to the desired depth (e.g. 0.3 inches). Each time the rotating cutter reaches the center of the disc, the cutter is raised from the disc face. In this manner, a single machining operation by an end mill is effective to produce both the generally planar sidewall surface portions and the concave, part-frustoconical sidewall surface portion.

While the invention has been described with certain particularity, it is not meant to be limited to the above described embodiments. For example, bevels may be provided on the support platform to join the top surface with the peripheral surface and the bottom surface with the peripheral surface. The generally planar sidewall surface portions need not be tapered. A fillet may be provided between each of the generally planar sidewall surface portions and the recessed surface. And the concave sidewall surface portion 28 could, rather than taking the form of a part of a truncated inverted cone, take the form of part of a cylinder, sphere, or any other geometric shape having symmetry about the vertical axis of the circular cylinder which defines the peripheral surface. Therefore, the present invention will include the disclosed embodiments and any modifications thereof which will fall within the scope of the appended claims.

I claim:

1. A device for supporting loads, comprising:

a generally disc-shaped support platform provided with a channel therein, the generally disc-shaped platform having a substantially planar horizontal top surface, a substantially planar horizontal bottom surface, and a substantially cylindrical peripheral surface extending in a vertical direction between the top surface and the bottom surface, wherein the channel includes a substantially planar recessed surface delimited by a generally U-shaped sidewall surface, the recessed surface being parallel to and recessed from the top surface and the generally U-shaped sidewall surface extending between the recessed surface and the top surface, wherein the generally U-shaped sidewall surface includes a pair of generally planar sidewall surface portions which extend chordally inwardly from the substantially cylindrical peripheral surface in parallel directions and which are joined together by a concave, part-frustoconical sidewall surface portion, and wherein the substantially cylindrical peripheral surface has the form of a circular cylinder, and wherein a central axis of the circular cylinder is coextensive with a central axis of the concave, part-frustoconical surface portion.

2. A device for supporting loads as recited in claim 1, wherein an angle of substantially between 100 and 135 degrees is formed between each of the generally planar sidewall surface portions and the substantially planar recessed surface.

3. A device for supporting loads as recited in claim 2, wherein a diameter of the substantially cylindrical peripheral surface is between 3 and 8 inches.

4. A device for supporting loads as recited in claim 3, wherein the substantially cylindrical peripheral surface has the form of a circular cylinder, and wherein the diameter of the circular cylinder is substantially between 4 and 5 inches.

5. A device for supporting loads as recited in claim 4, wherein a distance between the generally planar sidewall surface portions is approximately 1.5 inches.

6. A device for supporting loads as recited in claim 5, wherein a vertical distance between the substantially planar horizontal top surface and the substantially planar horizontal bottom surface is substantially between 0.4 and 1.0 inches.

7. A device for supporting loads as recited in claim 1, wherein a diameter of the substantially cylindrical peripheral surface is substantially between 4 and 5 inches, and wherein a diameter of the concave, part-frustonical sidewall surface portion is approximately 1.5 inches.

8. A device for supporting loads as recited in claim 7, wherein the generally disc-shaped support platform comprises aluminum.

9. A device for supporting loads as recited in claim 7, wherein the generally disc-shaped support platform comprises steel.

10. A device for supporting loads as recited in claim 7, wherein the generally disc-shaped support platform comprises a synthetic material.

11. A device for supporting loads as recited in claim 7, wherein the generally disc-shaped support platform is made from chrome plated metal.

12. A device for supporting loads, comprising:
a generally disc-shaped support platform provided with a cut-out therein, the generally disc-shaped platform having a substantially planar top surface, a substantially planar bottom surface, and a substantially cylindrical peripheral surface,
wherein the substantially cylindrical peripheral surface has the form of a circular cylinder,
wherein the circular cylinder defines a central axis,
wherein the cut-out defines a substantially planar recessed surface surrounded by a generally U-shaped sidewall surface, the recessed surface being parallel to and recessed from the top surface and the generally U-shaped sidewall surface extending between the recessed surface and the top surface,
wherein the generally U-shaped sidewall surface includes a pair of substantially straight sidewall surface portions which extend inwardly from the substantially cylindrical peripheral surface in parallel directions and which are joined together by a concave sidewall surface portion,
wherein the concave sidewall surface portion defines part of a geometric shape that is symmetrical about the central axis, and
wherein a diameter of the substantially cylindrical peripheral surface is at least twice as great as a diameter of the concave sidewall surface portion.

13. The device for supporting loads as recited in claim 12, wherein the geometric shape is a truncated cone.

14. The device for supporting loads as recited in claim 13, wherein the support platform comprises aluminum.

* * * * *